United States Patent
Kurata

(10) Patent No.: US 11,011,156 B2
(45) Date of Patent: May 18, 2021

(54) TRAINING DATA MODIFICATION FOR TRAINING MODEL

(71) Applicant: INTERNATIONAL BUSINESS MACHINES CORPORATION, Armonk, NY (US)

(72) Inventor: Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 16/381,426

(22) Filed: Apr. 11, 2019

(65) Prior Publication Data

US 2020/0327881 A1 Oct. 15, 2020

(51) Int. Cl.
*G10L 15/06* (2013.01)
*G10L 15/22* (2006.01)
*G10L 15/183* (2013.01)
*G10L 15/16* (2006.01)

(52) U.S. Cl.
CPC ............ *G10L 15/063* (2013.01); *G10L 15/16* (2013.01); *G10L 15/183* (2013.01); *G10L 15/22* (2013.01)

(58) Field of Classification Search
CPC ....... G10L 15/063; G10L 15/16; G10L 15/22; G10L 15/02; G10L 15/00; G10L 15/01; G10L 15/197; G10L 15/20; G10L 15/32; G10L 15/183

See application file for complete search history.

(56) References Cited

U.S. PATENT DOCUMENTS

| 8,644,611 | B2 | 2/2014 | Natarajan et al. |
| 9,934,778 | B2 | 4/2018 | Arisoy et al. |
| 2004/0186714 | A1 | 9/2004 | Baker |
| 2013/0006612 | A1* | 1/2013 | Xu .................. G10L 15/063 704/9 |
| 2015/0243285 | A1 | 8/2015 | Lane et al. |
| 2017/0154258 | A1 | 6/2017 | Liu et al. |
| 2018/0166071 | A1 | 6/2018 | Lee et al. |
| 2018/0232632 | A1* | 8/2018 | Kaskari ............... G06N 3/084 |
| 2018/0373979 | A1 | 12/2018 | Wang et al. |
| 2020/0175962 | A1* | 6/2020 | Thomson ........... G10L 15/183 |

FOREIGN PATENT DOCUMENTS

EP 2893435 B1 7/2015

OTHER PUBLICATIONS

European ISR & WO issued in PCT Application No. IB2020/052690 Dated May 28, 2020, pp. 1-9.

(Continued)

*Primary Examiner* — Yogeshkumar Patel
(74) *Attorney, Agent, or Firm* — Tutunjian & Bitetto, P.C.; Randall Bluestone

(57) ABSTRACT

A computer-implemented method for training a model is disclosed. The model is capable of retaining a history of one or more preceding elements and has a direction of prediction. The method includes obtaining a training sequence of elements. The method also includes splitting the training sequence into a plurality of parts. The method further includes selecting one part of the plurality of the parts depending on the direction of the model to generate a modified training data. The method includes further training the model using the modified training data.

25 Claims, 9 Drawing Sheets

(56) References Cited

OTHER PUBLICATIONS

Liu et al., "Efficient Lattice Rescoring Using Recurrent Neural Network Language Models", IEEE/ACM Transactions on Audio, Speech, and Language Processing 24(8)1438-1449 • Apr. 2016, 5 pages.

Xu et al., A Pruned RNNLM Lattice-Rescoring Algorithm for Automatic Speech RecognitionIEEE International Conference on Acoustics, Speech and Signal Processing (ICASSP), Apr. 2018, 5 pages.

* cited by examiner

TRAINING DATA MODIFICATION FOR TRAINING MODEL

BACKGROUND

The present disclosure, generally, relates to techniques for training a model used for prediction and techniques for rescoring a recognition hypothesis with a model.

In speech recognitions, a RNN (Recurrent type Neural Network) language model is utilized for decoding and for lattice rescoring that applies the RNN language model to a lattice generated by a weaker language model such as n-gram model. By virtue of stronger modeling capabilities of the RNN language model, error rates of the rescored lattices are reduced when comparing with the original lattices generated by the weaker language model.

The RNN language model has a hidden state that represents an infinite history of preceding words, which is the source of its strong modeling capability. The RNN language model is usually trained with written text and/or transcribed utterances that may not have errors. Automatically transcribed text may also be used as training data in a case of domain adaptation. However, trend of errors in the automatically transcribed training text is usually different from that of errors observed in lattices generated by the weaker language model.

The recognition errors are inevitably included at any word position in hypothesis given as a primary result of automatic speech recognition. However, the RNN language model is not trained to take care of such errors and thus the hidden state of the RNN would be collapsed when encountering errors in the hypothesis, which leads negative effect in calculating language model probabilities of succeeding words. Such negative effect on rescoring process due to an error in a hypothesis may also arise in other recognition task such as machine translation task, an image or movie captioning task, to name but a few.

Thus, there is a need for a technique capable of mitigating the negative impact on prediction due to an error in a hypothesis.

SUMMARY

According to an embodiment of the present invention, a computer-implemented method for training a model is provided. The method includes obtaining a training sequence of elements for the model, in which the model is capable of retaining a history of one or more preceding elements and has a direction of prediction. The method also includes splitting the training sequence into a plurality of parts. The method also includes selecting one part of the plurality of the parts depending on the direction of the prediction to generate a modified training data. The method further includes training the model using the modified training data.

According to the method of the embodiment of the present invention, the model can be trained so as to estimate probabilities starting from or ending at the middle of the sequence, which would appear actually in inputs to the model. It allows the model to have improved accuracy.

In a preferable embodiment, the trained model is used for rescoring one or more input sequences obtained as hypotheses of a recognition process. Thereby, error rates of the rescored result are expected to decrease in comparison with the original result of the recognition process. Since the model is trained so as to estimate probabilities starting or ending in the middle of a sequence, it allows the model to perform rescoring the hypothesis appropriately even when the hypothesis includes an error. Negative effects due to an error in the hypothesis can be mitigated.

In further preferable embodiment, in rescoring each input sequence with the model, the history is discarded at least in part in response to a condition related to confidence of the recognition process about one input element in the input sequence being satisfied. Thereby, error rates of the rescored result are further reduced in comparison with a rescored result without discarding of the history based on the confidence of the recognition process.

In a further preferable embodiment, the model has a hidden state that represents the history. The history is discarded by resetting the hidden state of the model to a state that has accepted a predetermined symbol. The rescoring is restarted in response to one satisfying the condition. If an element having concern about confidence is included in the hypothesis, resetting prevents such element from collapsing the hidden state of the model. Such uncertain element in the hypothesis can propagate a reasonable hidden state for succeeding elements, which suppress occurrence of burst errors after the uncertain element in the hypothesis. Thereby, the score for the hypothesis after the uncertain element can be calculated with reasonable hidden state.

In a particular embodiment, the method further includes adding a predetermined symbol at a boundary of the one part. The modified training data includes the one part and the predetermined symbol. The predetermined symbol may represent a beginning of a sequence or an end of a sequence depending on the direction of the prediction. Alternatively, the predetermined symbol may represent an error of recognition and the model has an additional token corresponding to the predetermined symbol.

In a particular embodiment, the direction of the prediction is a forward direction, a latter part of the plurality of the parts is selected as the one part and the boundary at which the predetermined symbol is added is a beginning of the latter part. Alternatively, the direction of the prediction is a backward direction, a former part of the plurality of the parts is selected as the one part and the boundary at which the predetermined symbol is added is an end of the former part.

In a preferable embodiment, the model is a recurrent type neural network language model, the training sequence of the elements is a training sentence including a plurality of words, the recognition process is speech recognition and a result outputted from the speech recognition is rescored with the model. Thereby, it allows the speech recognition to have improved performance.

According to other embodiments of the present invention there is provided a computer-implemented method for rescoring an input sequence obtained as a hypothesis of a recognition process. The method includes preparing a model for rescoring the hypothesis. The model is capable of retaining a history of one or more preceding elements and has a direction of rescoring. The method also includes feeding the input sequence into the model according to the direction. The method further includes, in response to a condition related to confidence of the recognition process about one input element in the input sequence being satisfied, discarding the history at least in part. The method includes further outputting a result of rescoring the input sequence.

According to the method of the other embodiments of the present invention, error rates of the result are expected to decrease in comparison with an original result of the recognition process, as well as a rescored result without discarding of the history based on the confidence of the recognition process. Since negative effect due to an error in the hypothesis can be mitigated, it allows the model to perform rescoring the hypothesis appropriately even when the hypothesis includes an error.

In a preferable embodiment, the model has a hidden state representing the history and the history is discarded by resetting the hidden state of the model to a state having accepted a predetermined symbol. The rescoring is restarted in response to one satisfying the condition. If an element having concern about confidence is included in the hypothesis, resetting prevents such element from collapsing the hidden state of the model. Such uncertain element in the hypothesis can propagate a reasonable hidden state for succeeding elements, which suppress occurrence of burst errors after the uncertain element in the hypothesis. Thereby, the score for the hypothesis after the uncertain element can be calculated with reasonable hidden state.

In a preferable embodiment, the model is built by: obtaining a training sequence of elements; splitting the training sequence into a plurality of parts; selecting one part of the plurality of the parts depending on the direction of the rescoring to generate a modified training data; and training the model using the modified training data. Since the model is trained so as to estimate probabilities starting from or ending at the middle of the sequence, negative effect due to an error in the hypothesis can be further mitigated. It is possible to make the model resistance to an error in the hypothesis when rescoring the hypothesis.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for training a model, in which the model is capable of retaining a history of preceding elements in a sequence and may be used for rescoring a primary hypothesis generated by a speech recognition process. One or more other embodiments according to the present invention are directed to computer-implemented methods, computer systems and computer program products for rescoring a hypothesis with a model, in which the model used for hypothesis rescoring is capable of retaining a history of preceding elements in a sequence and the hypothesis to be rescored is obtained from a speech recognition process.

Hereinafter, first referring to FIG. 1 together with FIG. 2, a computer system for training a RNN (Recurrent type Neural Network) language model and for rescoring a primary hypothesis generated by a speech recognition process according to an exemplary embodiment of the present invention will be described. Then, referring to FIG. 3, a computer-implemented method for training a RNN language model with training data modification according to an exemplary embodiment of the present invention will be described. Then, referring to FIG. 4 together with FIGS. 5 and 6, a computer-implemented method for rescoring a primary hypothesis with a RNN language model according to an exemplary embodiment of the present invention will be described. Then, with reference further to FIG. 7 and FIG. 8, other exemplary embodiment according to the present invention will be described, in which the model to be trained is a backward RNN language model.

Furthermore, experimental studies on the speech recognition with novel training data modification and rescoring functionality according to the exemplary embodiments of the present invention will be described. Finally, referring to FIG. 9, a hardware configuration of a computer system according to one or more embodiments of the present invention will be described.

Figure 1:
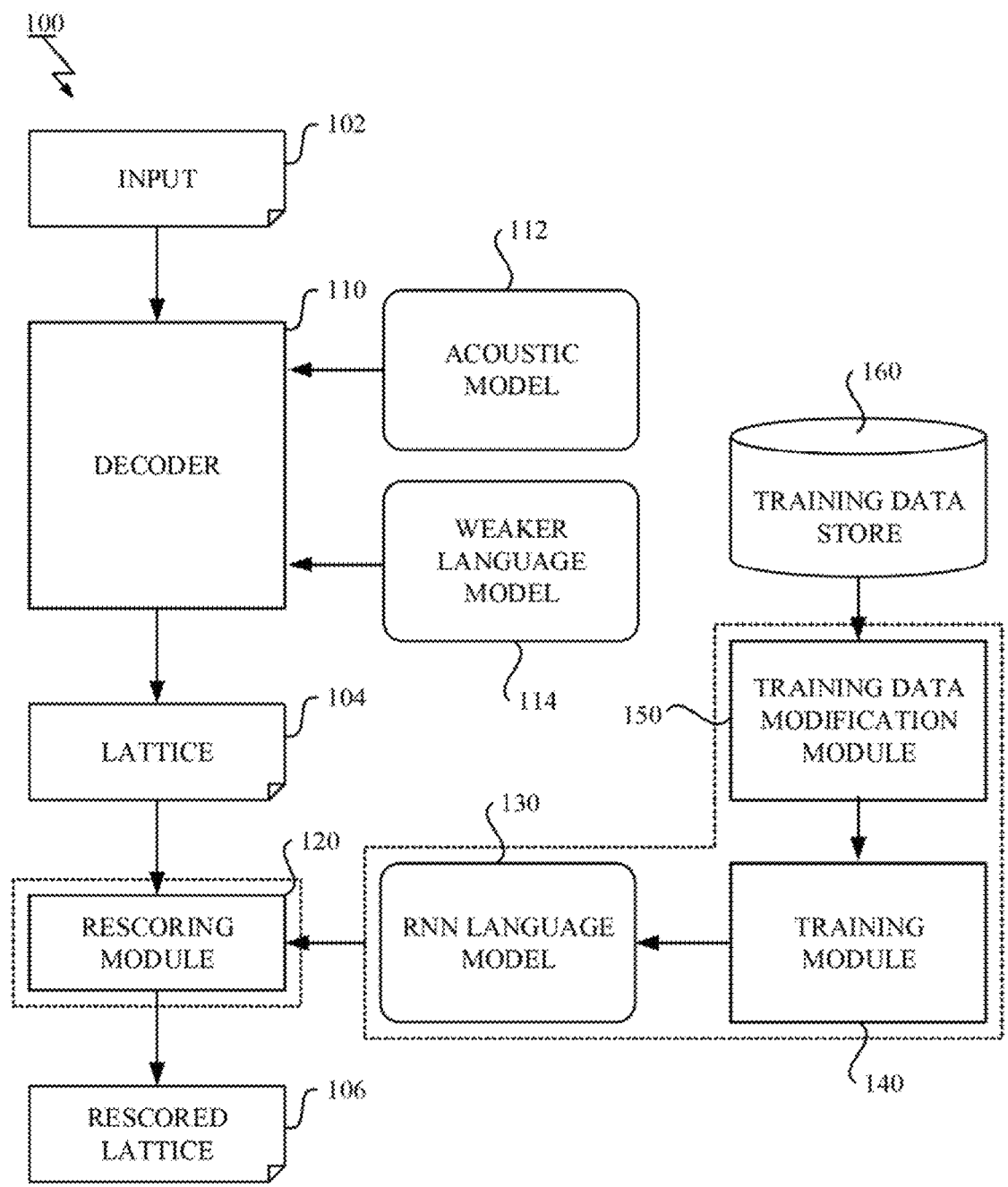
FIG. 1 illustrates a block diagram of a speech recognition system including a rescoring module and a training data modification module according to an exemplary embodiment of the present invention.

Referring to FIG. 1, a block diagram of a speech recognition system 100 according to an exemplary embodiment of the present invention is described. As shown in FIG. 1, the speech recognition system 100 includes a decoder 110 that receives an input 102 and outputs a primary recognition hypothesis in a form of a lattice 104; an acoustic model 112 used by the decoder 110; and a weaker language model 114 used by the decoder 110; a rescoring module 120 that receives the lattice 104 and outputs a rescored lattice 106; and a RNN language model 130 used by the rescoring module 120.

The input 102 may be speech signal digitalized by sampling analog audio input at a predetermined sampling frequency and a predetermined bit depth. Before entering the decoder 110, the speech signal may be converted into a sequence of acoustic features via an appropriate frontend with any known acoustic feature analysis.

The decoder 110 predicts plausible speech contents for the input 102 using the acoustic model 112 and the weaker language model 114, and outputs primary recognition hypotheses as the lattice 104.

The weaker language model 114 is a model for estimating probability distribution over a sequence of words, or a sentence. The weaker language model 114 can predict a succeeding word in a sentence based on preceding words already observed in the sentence. The weaker language model 114 may be, but not limited to, a unigram model, an n-gram model, a maximum entropy language model or a skip-gram language model.

If resources are available without any restriction, any state-of-the art language model would be employed. However, available resources are practically limited and applying stronger language model in an early stage of speech recognition is not efficient. The weaker language model 114 is a weaker model in a sense that it includes less computational resources to generate a hypothesis than that of more sophisticated language models such as RNNs and has modelling capability adequate to the included computational resources.

The acoustic model 112 is a model for estimating probabilities to generate the sequence of the acoustic features when the sequence of the words is given. The acoustic model 112 may be based on a GMM (Gaussian Mixture Model)/HMM (Hidden Markov Model) or NN (Neural Network)/HMM systems that uses the NN instead of GMM in the GMM/HMM system, where the HMM is used to deal with temporal variability of speech and the GMM is used to determine how well each state of each HMM fits the frame or the short window of the frames of input. The neural network employed in the NN/HMM systems may be a DNN (Deep Neural Network), CNN (Convolutional Neural Network), or RNN based architecture.

The decoder 110 outputs primary recognition hypothesis as the lattice 104. The lattice 104 represents a plurality of decoded sentences. The lattice 104 may include a list of nodes and a list of edges. Each node in the lattice 104 may represent a point in time. Each edge connected between a paired start and end nodes may represent a word spanning a segment starting at the time of the start node and ending at the time of the end node. In the described embodiment, the decoder 110 is configured to output the plurality of the hypotheses in the form of a lattice. However, in other embodiments, the decoder 110 may output the hypotheses in a form of a prefix tree structure or a list of N-best hypotheses. The form of the representation of the hypotheses is not limited.

The lattice 104 may include confidence information that is calculated in generating the primary recognition hypothesis. According to the acoustic model 112, the decoder 110 may calculate an acoustic score for each unit such as a frame and a statistic such as an average of acoustic scores over a plurality of units corresponding to each word. According to the weaker language model 114, the decoder 110 may calculate a language score for each word. Furthermore, the decoder 110 may calculate a total confidence score by integrating the acoustic score and the language score. The confidence scores including the acoustic score, the average acoustic score, the language score, the total confidence score, or the combination thereof may be given to each word in the lattice 104 and the confidence of the recognition about each word is represented by these confidence scores.

The rescoring module 120 is configured to rescore each sentence in the lattice 104 using the RNN language model 130 and output the rescored lattice 106. The RNN (Recurrent type Neural Network) language model 130 may have any architecture of recurrent type with a hidden state, including basic recurrent neural networks, LSTMs (Long Short-Term Memory), Elman networks, Jordan networks, Hopfield networks, GRUs (Gated Recurrent Unit), etc. The RNN is a class of neural networks including connections within a layer when comparing with a feed-forward network that includes connection between subsequent layers. The RNN language model 130 has a hidden state that represents an infinite history of preceding words and is capable of retaining the history of the preceding words in the hidden state. Note that the term "preceding" and "succeeding" mean preceding and succeeding according to a direction in which the sequence of the words is fed to the RNN language model 130.

The RNN language model 130 has a modelling capability stronger than the weaker language model 114. Since the hypotheses obtained from the primary speech recognition is subject to the hypothesis rescoring, a more sophisticated and resource consuming language model can be employed even though available resources are practically limited.

The rescoring module 120 rescores each hypothesis in the original lattice 104 using the RNN language model 130 in order to find the best path through the lattice 104 or re-rank the paths in the original lattice 104. New language scores based on the RNN language model 130 are calculated to find the best path or re-rank the paths in combination with the acoustic scores given in the original lattice 104. The rescored lattice 106 represents a plurality of the sentences with respective new scores. Using the rescored lattice 106 to select the best hypothesis or re-rank the hypotheses is optional and may be done if necessary.

In the described embodiment, the original lattice 104 is entered into the rescoring module 120 directly. However, in one or more embodiments, the original lattice 104 may be subjected to other processing such as lattice expansion before or during rescoring in order to obtain an expanded lattice.

As shown in FIG. 1, the speech recognition system 100 further includes a training module 140, a training data modification module 150, and a training data store 160.

The training module 140 performs a training process using given training data to construct the RNN language model 130. In the described embodiment, the training data store 160 provides a collection of transcriptions. The transcriptions are transcribed by human experts. Automatically transcribed text may also be contemplated in a specific case such as domain adaptation.

The RNN language model 130 can be trained by using appropriate algorithm. The RNN can be trained by gradient descent methods such as full or truncated BPTT (Back-Propagation Through Time) and RTRL (Real-Time Recurrent Learning) algorithms.

As described above, the training sentences stored in the training data store 160 are generally transcribed by the human expert. There are few errors in the human transcribed texts. On the other hand, the lattice 104 generated by the decoder 110 generally include one or more errors at various word positions. Even state-of-the-art ASR systems mistake the recognition. Such error in the hypothesis causes the hidden state of the RNN language model 130 to collapse during rescoring process. Even trend of errors in the automatically transcribed training text is usually different from that of errors observed in the lattices 104. Thus, there is a need to train the RNN language model 130 to allow for such errors in the hypothesis.

For this purpose, the training data modification module 150 according to the exemplary embodiment is configured to modify the original training data to generate a modified training data so as to allow the RNN language model 130 that is trained based on the modified training data to take care of such errors in the lattice 104.

More specifically, the training data modification module 150 is configured to obtain each training sentence from the training data store 160 and split the training sentence into a plural parts, each of which includes one or more words.

Figure 2:
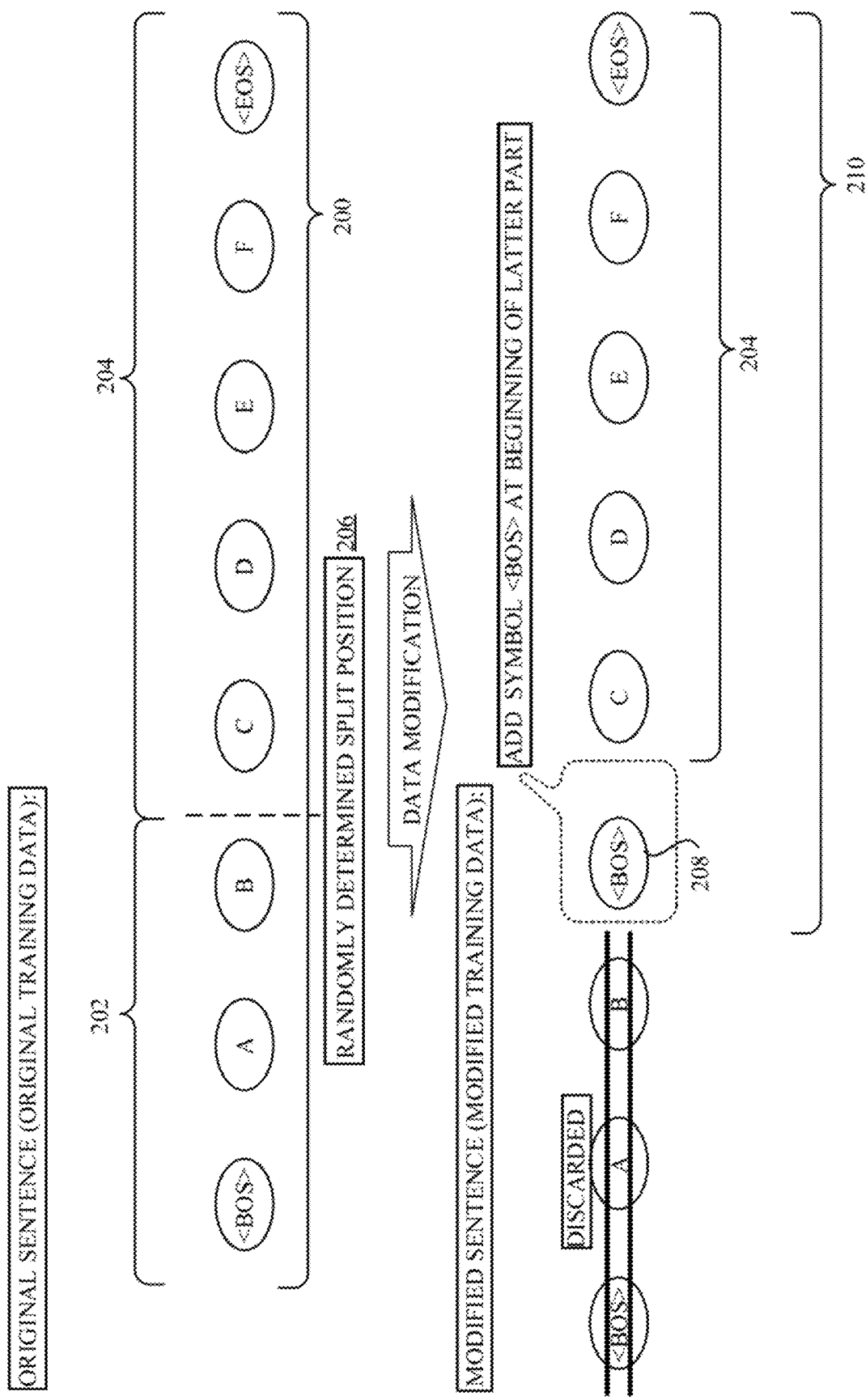
FIG. 2 describes a schematic of training data modification for training a RNN (Recurrent type Neural Network) language model according to the exemplary embodiment of the present invention.

FIG. 2 describes a schematic of training data modification for training the RNN language model 130. As shown in FIG. 2, the training sentence 200 is divided into two parts 202, 204 at a split position 206 that may be determined randomly.

The training data modification module 150 is further configured to select one part of the plural parts depending on the direction of rescoring of the RNN language model 130. In the described embodiment, the RNN language model 130 is trained so that it predicts a next word in a sentence based on previous words given from the beginning of the sentence. Thus, the direction of the rescoring of the RNN language model 130 is a forward direction. In this case, the latter part 204 is selected from among the plural parts 202, 204. Note that the terms "next" and "previous" mean next and previous according to the direction of the sentence.

The training data modification module 150 is further configured to add a predetermined symbol at a boundary (or an edge) of the selected part. In the described embodiment, the boundary at which the predetermined symbol is added is a beginning of the latter part 204 and the predetermined symbol represents a beginning of a sequence (BOS), or a start of a sentence (SOS). Thus, the modified training data 210 includes the selected latter part 204 and the predetermined symbol 208 added at the beginning thereof. Note that the non-selected former part 202 may be discarded from the training data.

In the described embodiment, the direction of rescoring of the RNN language model 130 is the forward direction. However, in other embodiments, the RNN language model 130 can be trained so as to predict a previous word in a sentence based on next words given from the end of the sentence. In this case, the direction of rescoring of the RNN language model 130 is a backward direction. If the direction of rescoring of the RNN language model 130 is the backward direction, the former part 202 is selected from among the plural parts 202, 204 and the boundary at which the predetermined symbol is added is an end of the former part 202. Also, in this case the predetermined symbol represents an end of a sequence (EOS).

Instead of adding the beginning or end of sentence symbol, both of which are the same as symbols represent a proper beginning of a sentence and a proper end of a sentence, in further other embodiments, the predetermined symbol may be a special symbol that represents occurrence of an error of a speech recognition (e.g., ASR_ERROR). In this embodiment, the RNN language model 130 is trained to have an additional token corresponding to the special symbol (ASR_ERROR), which makes it possible to handle a natural beginning or end of the sentence and an intentionally created beginning or end of the sentence distinctively.

As described above, the split position is determined randomly. However, in other embodiments, the split position may be determined statistically such that the training sentence is divided at a position where recognition errors are likely to occur or is not divided at a position where recognition errors are less likely to occur.

Note that the training data modification module 150 does not modify all training sentence stored in the training data store 160. The training sentences to be divided may be randomly determined at a predetermined rate from among the collection of the training sentences in the training data store 160. For example, only one sentence out of a predetermined number of sentences (rates in the range of approximately 10% to 50%) may be subject to the training data modification.

In the described embodiment, one training sentence is described to be picked up to generate one modified training sentence. However, in other embodiments, the same training sentence may be picked up multiple times to generate plural modified training sentences with different split positions. In this case, it can be said that the training data is being augmented. Furthermore, the modified training sentence 210, which is a half of an original sentence and is obtained by previous training data modification, may be further subjected to subsequent training data modification.

The training module 140 is configured to train the RNN language model 130 using the modified training data, generally together with the original training sentences that are stored in the training data store 160 without data modification. In the described embodiment, the original training data subjected to the training data modification is not used for training any more. However, in other embodiments, the original training data subjected to the training data modification may be used still as training data.

As described above, the RNN language model 130 trained by the training module 140 can be used for hypothesis rescoring performed by the rescoring module 120. Due to the training data modification, the RNN language model 130 can be trained so as to estimate probabilities starting from the middle of the sentence or ending at the middle of the sentence. Unexpectedly, it contributed to mitigate the negative effect due to an error observed in the hypothesis. Also note that in other embodiments, the RNN language model 130 trained by the training module 140 can be used for decoding process performed by the decoder 110.

The aforementioned training data modification contributes to an improvement in performance of the speech recognition system 100. Furthermore, by changing the logic of the rescoring processing, further improvement in the performance of the speech recognition system 100 can be expected.

The rescoring module 120 rescores each input sentence in the original lattice 104. In a preferable embodiment, the rescoring module 120 is further configured to discard the history retained in the RNN language model 130 at least in part when a predetermined condition is satisfied. The predetermined condition is a condition related to the confidence of the speech recognition about one word in the input sentence and used to capture an uncertain word that is likely to have an error. In the described embodiment, the predetermined condition includes a threshold for confidence information (e.g., average acoustic score, a language score, a total score) given for a word in the input sentence. The threshold can be determined empirically or statistically. In other embodiments, more sophisticated condition may be contemplated. For example, other neural network model trained to judge the timing of discarding the history can be used to make a determination as to whether the predetermined condition is satisfied or not.

Since the history is represented by the hidden state of the RNN language model 130, the history can be discarded by resetting the hidden state of the RNN language model 130 to a state that have accepted the predetermined symbol, which is the beginning of sentence (<BOS>) if the direction of the model is the forward direction and the end of the sentence (<EOS>) if the direction of the model is the backward direction or the special symbol (<ASR_ERROR>) when it is used. The rescoring may be restarted after the word satisfying the predetermined condition.

In particular embodiments, each of modules 110, 120, 140 and 150 described in FIG. 1 may be implemented as, but not limited to, a software module including instructions and/or data structures in conjunction with hardware components such as a processor, a memory, etc.; a hardware module including electronic circuitry; or a combination thereof. These modules 110, 120, 140 and 150 described in FIG. 1 may be implemented on a single computer system such as a personal computer, a server machine, or over a plurality of devices such as a client server system, an edge computing system, a computer cluster in a distributed manner.

Hereinafter, referring to a flowchart shown in FIG. 3, a process for training a RNN language model with training data modification according to an exemplary embodiment of the present invention is described.

Figure 3:
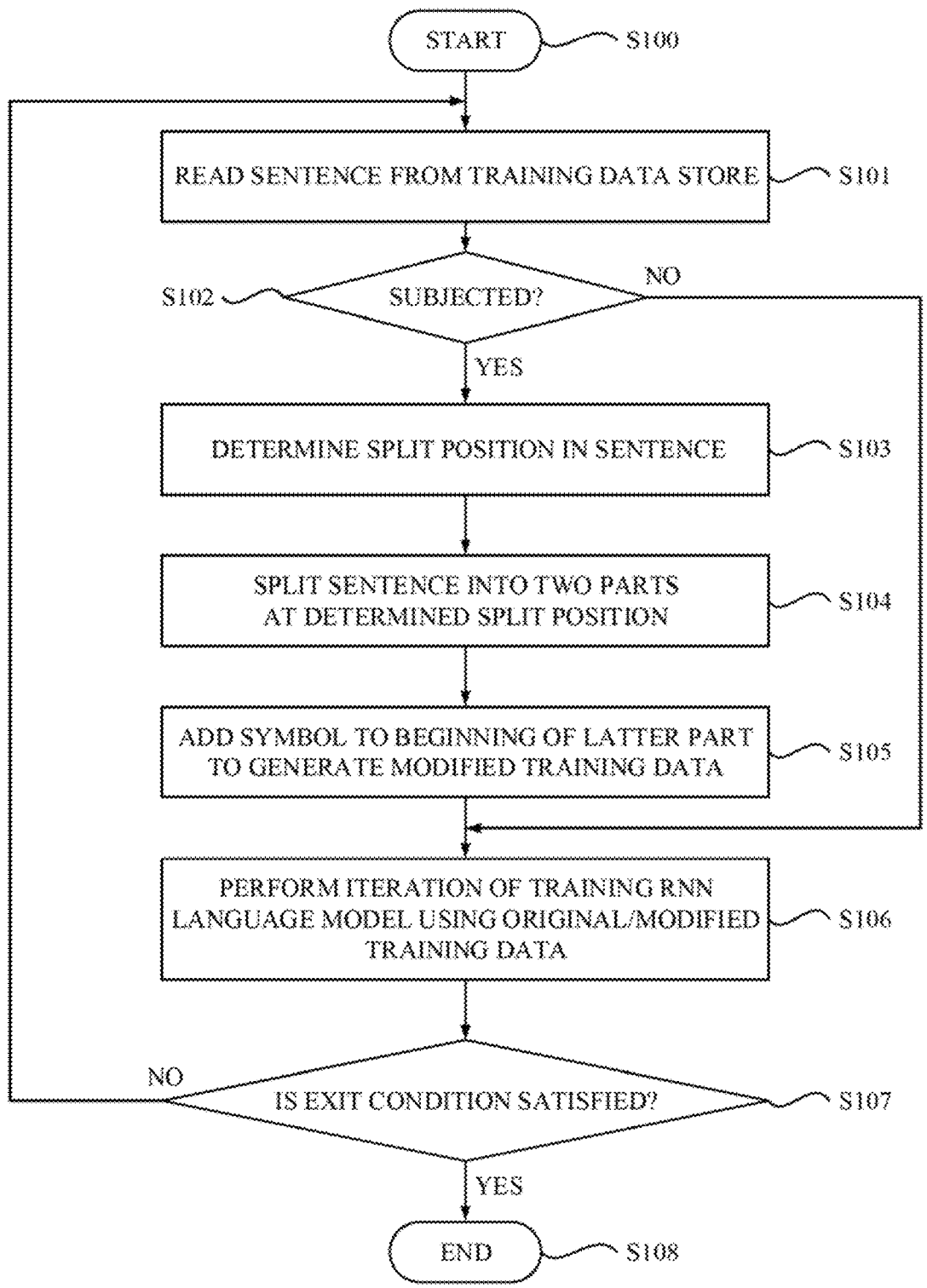
FIG. 3 is a flowchart depicting a process for training a RNN language model used for hypothesis rescoring according to an exemplary embodiment of the present invention.

Note that the process shown in FIG. 3 may be executed by the training module 140 with the training data modification module 150, i.e., a processing unit that implements the training module 140 and the training data modification module 150 shown in FIG. 1. Also, the process shown in FIG. 3 is used to train the RNN language model 130 so that it predicts forwardly. Thus, the direction of the rescoring of the RNN language model 130 to be trained is a forward direction.

The process shown in FIG. 3 may begin at step S100 in response to receiving, from an operator, a request for training the RNN language model 130. Note that a new RNN model (e.g., randomly initialized) or pre-trained model may be given.

At step S101, the processing unit may read a training sentence from the training data store 160. The collection of the training sentences to be used for training may be designated in the request.

At step S102, the processing unit may determine whether the training sentence read from the training data store 160 is subject to the training data modification or not. For example, only one out of several sentences may be subject to the training data modification. The predetermined rate may be designated in the request. If the processing unit determines that the current training sentence is subject to the training data modification at the step S102, the process may proceed to step S103.

At step S103, the processing unit may determine a split position in the training sentence randomly.

At step S104, the processing unit may split the training sequence into plural parts at the split position determined at step S103 and select one part of the plural parts depending on the direction of the RNN language model 130. In the process shown in FIG. 3, the direction of the RNN language model 130 is the forward direction so the latter part is selected.

At step S105, the processing unit may add a beginning of sentence symbol 208 at the beginning of the latter part 204 to generate the modified training data 210 as described with reference to FIG. 2. The modified training data 210 includes the selected latter part 204 and the predetermined symbol 208.

If the processing unit determines that the current training sentence is not subject to the training data modification at the step S102, the process may directly proceed to step S106.

At step S106, the processing unit may perform an iteration of training the RNN language model 130 with the modified or original training data. Note that the iteration of the training may be performed for each training sentence (e.g., online training) or a predetermined set of training sentences (e.g., batch training, mini-batch training).

At step S107, the processing unit may determine whether an exit condition is satisfied or not. For example, when the predetermined number of epochs has been completed, the exit condition is determined to be satisfied. If the processing unit determines that the exit condition is not satisfied yet at step S107, the process may loop back to step S101 for further iteration. On the other hand, if the processing unit determines that the exit condition has been already satisfied at the step S107, the process may proceed to step S108 and the process may end at the step S108.

According to the process for training the RNN language model with the training data modification shown in FIG. 3, the RNN language model 130 can be trained so as to estimate probabilities starting from the middle of the sequence. Unexpectedly, it contributed to mitigate the negative effect due to an error observed in the hypothesis, making the model more resistance to an error in the hypothesis when rescoring the hypothesis. Accordingly, error rates of the rescored lattice 106 are expected to decrease in comparison with the original lattice 104.

Hereinafter, referring to FIG. 4 together with FIGS. 5 and 6, the rescoring process with resetting operation according to an exemplary embodiment of the present invention is further described. Note that the rescoring process described with reference to a series of FIGS. 4-6 may be executed by the rescoring module 120 with the RNN language model 130, i.e., a processing unit that implements the rescoring module 120 and the RNN language model 130 shown in FIG. 1. Also note that the direction of rescoring of the RNN language model 130 is the forward direction.

At first the rescoring module 120 may prepare the RNN language model 130 for rescoring hypothesis on a memory, for example. Then the lattice 104 is read by the rescoring module 120. As shown in FIG. 4, the lattice 104 includes a plurality of nodes 104*a* and a plurality of edges 104*b* (only one node and one edge are given numerals in the drawing representatively) connected between paired nodes. Each node 104*a* in the lattice 104 may represent a point in time. Each edge 104*b* connected between a paired start and end nodes may represent a word spanning a segment starting at the time of the start node and ending at the time of the end node. Although a plurality of paths can be drawn in the lattice 104, here one input sentence 104*c* is focused in order to describe operation of the rescoring process.

The rescoring module 120 feeds each word in the input sentence 104*c* into the RNN language model 130 successively according to the direction that is forward direction in the described embodiment. Thus, a word sequence {<BOS>, V, W, X, Y, Z, <EOS>} is fed into the RNN language model 130 in that order. The rescoring module 120 receives language model probabilities from the RNN language model 130 to obtain a new language score.

Figure 5:
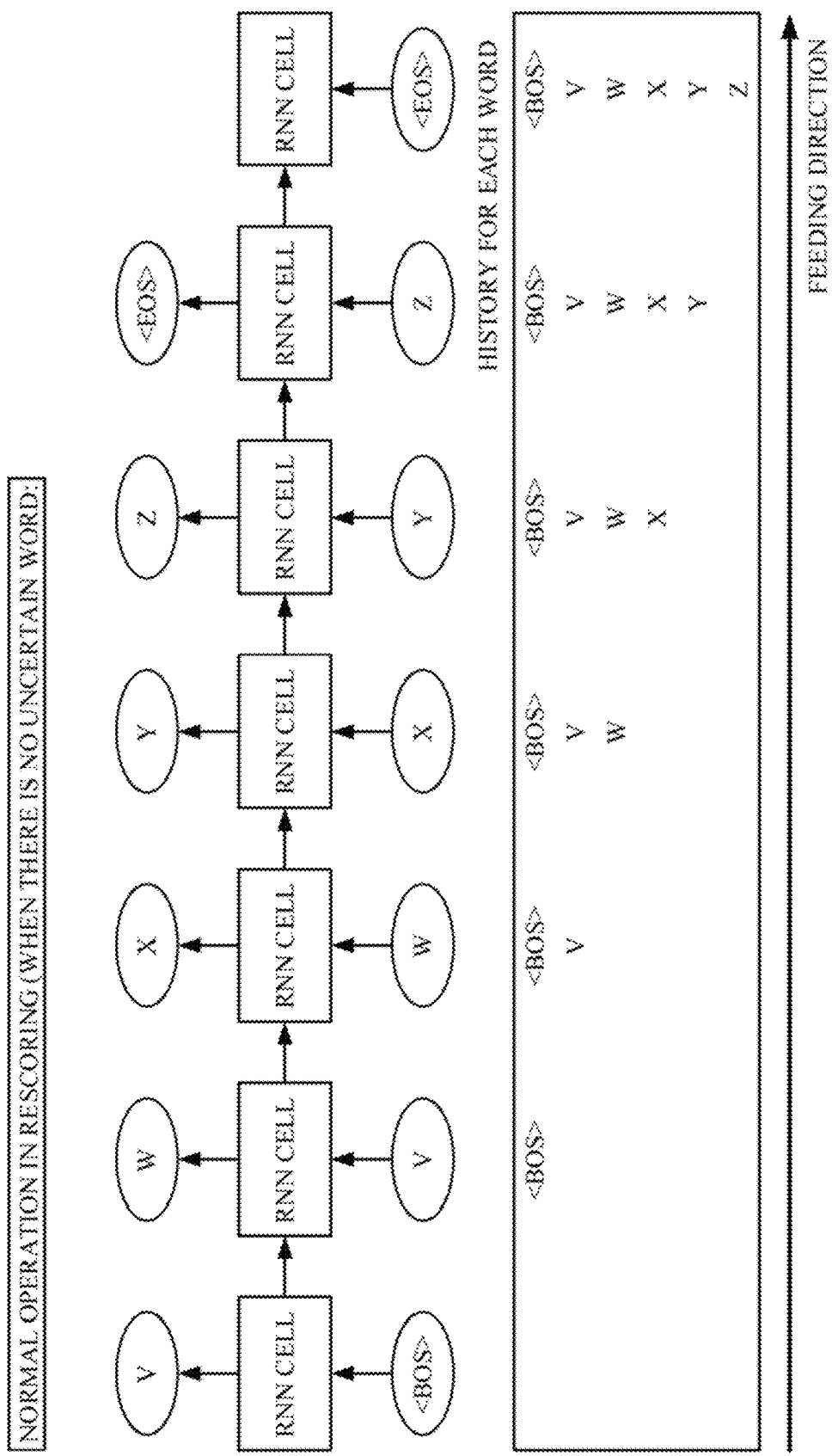
FIG. 5 describes a schematic of normal operation in the rescoring process when there is no uncertain word in a given hypothesis according to the exemplary embodiment of the present invention.

FIG. 5 describes a schematic of normal operation in the rescoring process. When there is no uncertain word in hypothesis, for each time a word is fed into the RNN language model 130 the history of the preceding (previous) words is accumulated in the hidden state 130*a* of the RNN language model 130. The hidden state may affect the calculated probability of the succeeding (next) words.

Referring back to FIG. 4, in rescoring the input sentence, the rescoring module 120 according to the exemplary embodiment may reset the hidden state 130a of the RNN language model 130 to a state that have accepted the predetermined symbol (the beginning of sentence in the described embodiment) in response to a predetermined condition being satisfied. The predetermined condition is a condition related to the confidence of the recognition about one input word in the input sentence 104c. The predetermined condition is used to capture an uncertain word that is likely to have an error. In the described embodiment, the predetermined condition includes a threshold for confidence score (e.g., average acoustic score, a language score, a total score) given for a word in the input sentence. When a word with a confidence score lower than the threshold is found, the rescoring module 120 resets the hidden state 130a of the RNN language model 130.

Figure 6:
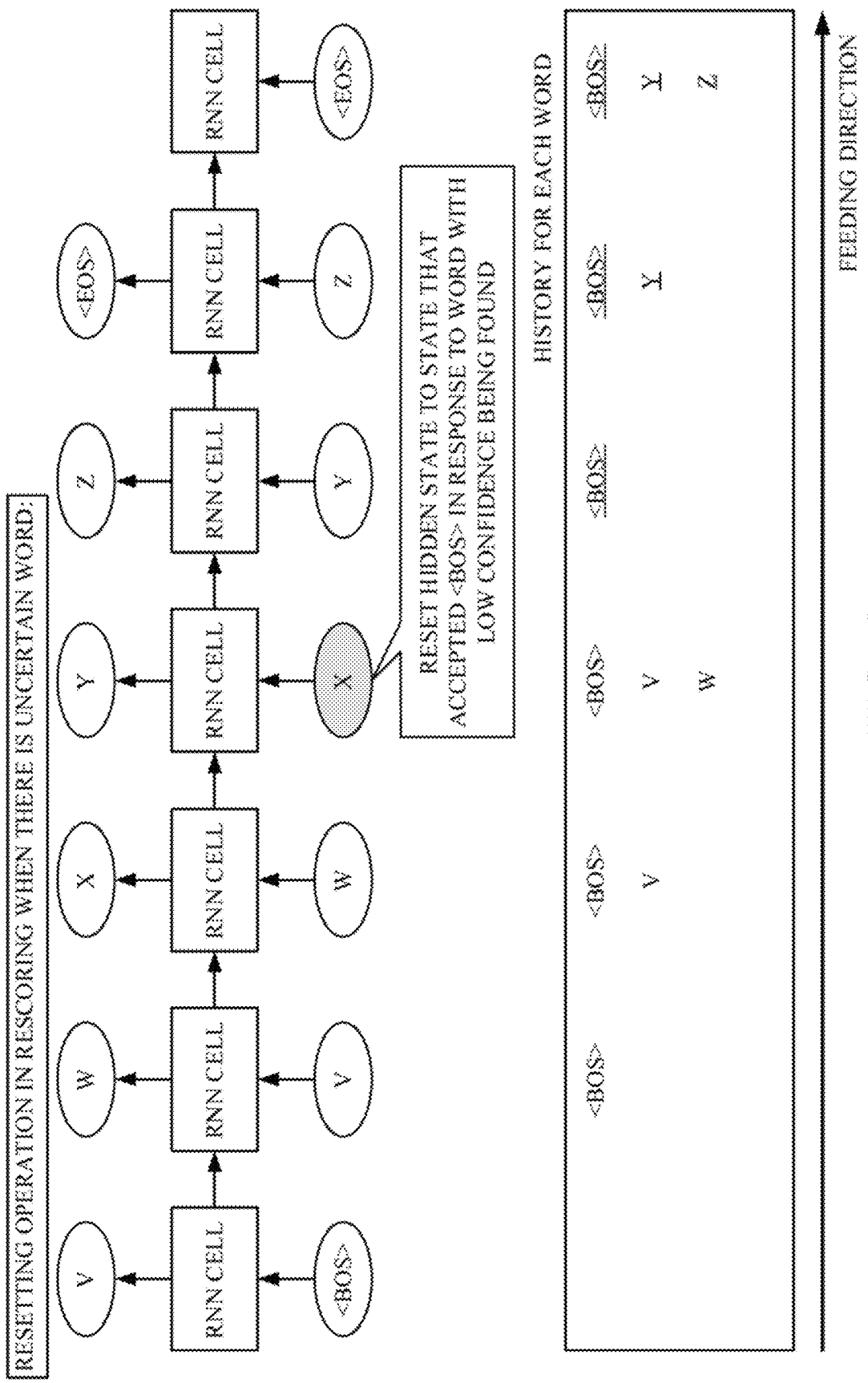
FIG. 6 describes a schematic of resetting operation in the rescoring process when there is an uncertain word in a given hypothesis according to the exemplary embodiment of the present invention.

FIG. 6 describes a schematic of resetting operation in the rescoring process. When there is an uncertain word (X) in the hypothesis, the history of the preceding (previous) words accumulated in the hidden state of the RNN language model 130 is discarded at timing after the uncertain word (X) is fed. The rescoring is restarted after the word satisfying the predetermined condition (X), as if the latter part of the input sentence is started from the position of the uncertain word (X). The former part of the input sentence including the uncertain word (X) may be preserved. Thus, the score of the input sequence {<BOS>, V, W, X, Y, Z,<EOS>} is calculated as a sum of scores of the former part {<BOS>, V, W, X} and the latter part {<BOS>, Y, Z, <EOS>}. As a result, the occurrence of burst error may be prevented.

Figure 4:
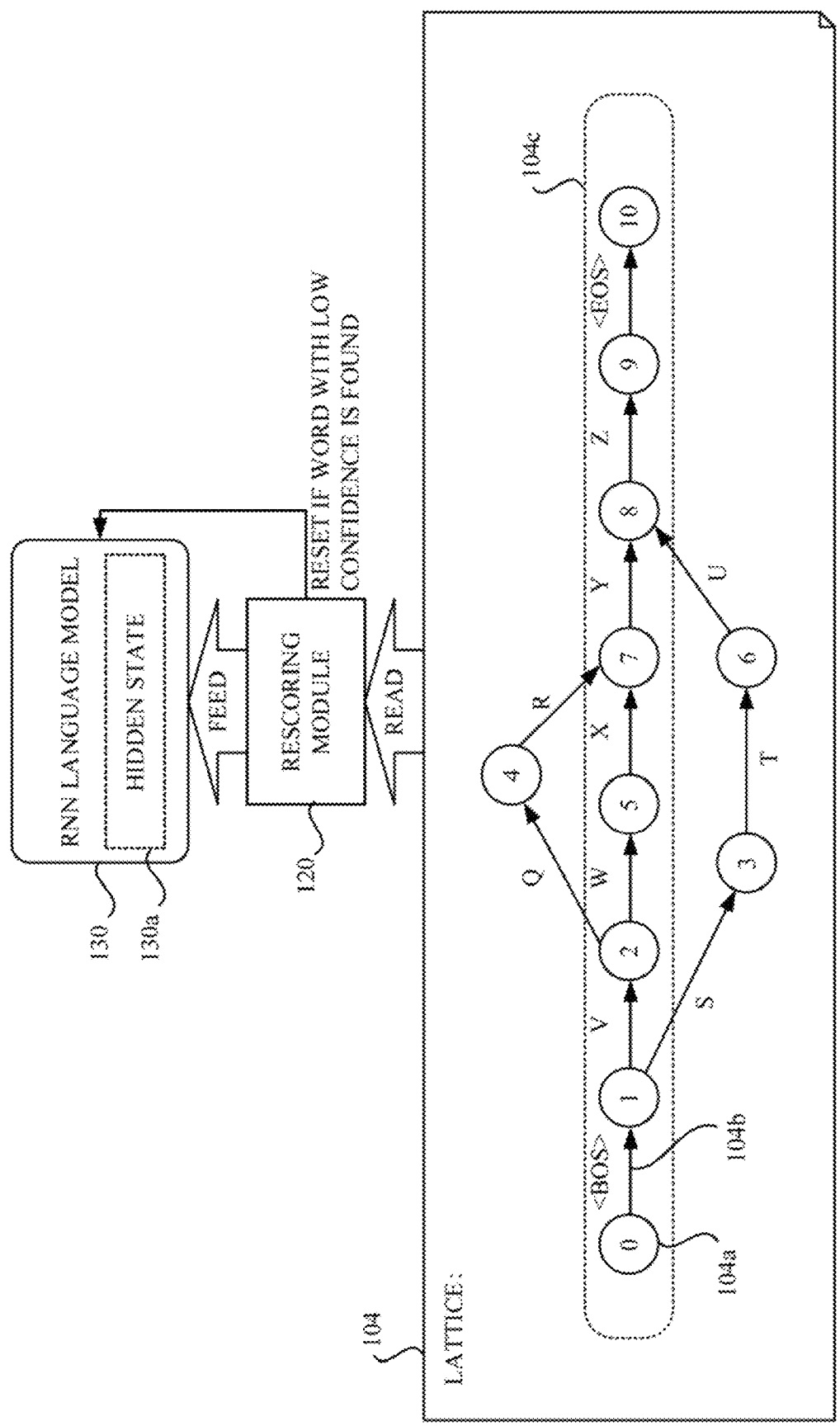
FIG. 4 describes a schematic of a rescoring process with resetting operation according to an exemplary embodiment of the present invention.

According to the process for rescoring an input sentence with resetting operation shown in FIGS. 4-6, error rates of the rescored lattice 106 are expected to decrease in comparison with the original lattice 104 of the speech recognition, as well as a rescored lattice without discarding of the history based on the confidence of the speech recognition. Since negative effect due to an error in the hypothesis can be mitigated, it allows the RNN language model 130 to perform rescoring the hypothesis appropriately even when the hypothesis includes an error.

If a word having concern about confidence is included in the hypothesis, resetting prevents such word from collapsing the hidden state of the RNN language model 130. Such uncertain element in the hypothesis can propagate a reasonable hidden state for succeeding words, which suppress occurrence of burst errors after the uncertain words in the hypothesis. Thereby, the score for the hypothesis after the uncertain element can be calculated with reasonable hidden state.

Furthermore, when employing the RNN language model 130 trained by the training module 140 with the training data modification module 150, the RNN language model 130 is trained so as to estimate probabilities starting from or ending at the middle of the sequence. The negative effect due to an error in the hypothesis can be further mitigated. It is possible to make the RNN language model 130 more resistance to errors in the hypothesis when rescoring the hypothesis. Combining with the characteristics of the RNN language model 130 further reduces the error rates of the rescored lattices 104.

In the aforementioned embodiment, the direction of the RNN language model 130 is described to be the forward direction. Referring to a flowchart shown in FIG. 7, a process for training a backward RNN language model with training data modification according to other exemplary embodiment of the present invention is described.

Figure 7:
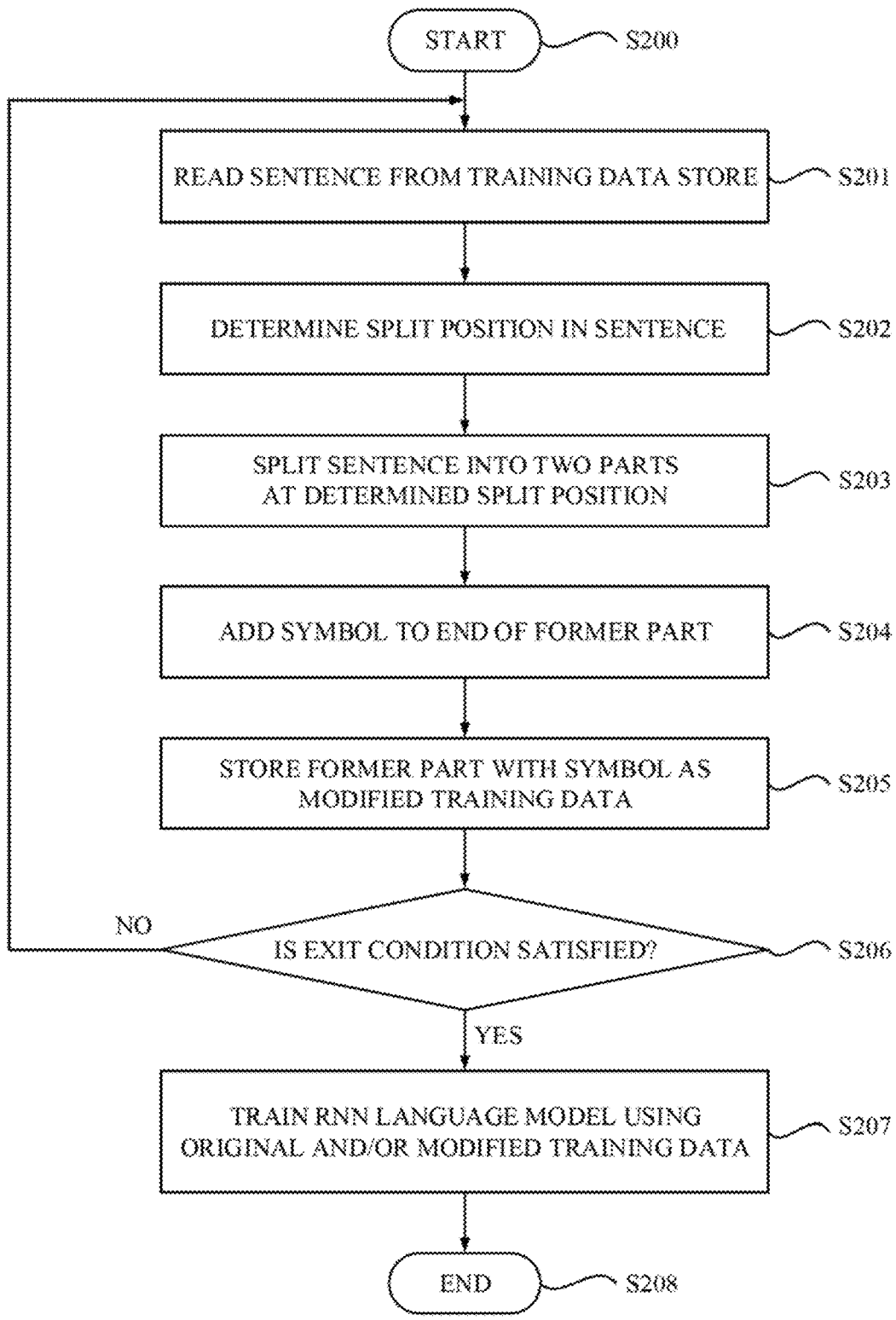
FIG. 7 is a flowchart depicting a process for training a backward RNN language model used for hypothesis rescoring according to other exemplary embodiment of the present invention.

Note that the process shown in FIG. 7 may be executed by the training module 140 with the training data modification module 150, i.e., a processing unit that implements the training module 140 and the training data modification module 150 shown in FIG. 1. The process shown in FIG. 7 may begin at step S200 in response to receiving, from an operator, a request for training the RNN language model 130.

At step S201, the processing unit may read a training sentence from the training data store 160. At step S202, the processing unit may determine a split position in the training sentence randomly. At step S203, the processing unit may split the training sequence into plural parts at the split position determined at step S202 and select one part of the plural parts depending on the direction of the RNN language model 130. In the process shown in FIG. 7, the direction of the RNN language model 130 is the backward direction so the former part is selected.

At step S204, the processing unit may add an end of sentence symbol <EOS> at the end of the former part to generate the modified training data. The modified training data includes the selected former part and the predetermined symbol <EOS> added at the end thereof. Note that the non-selected latter part may be discarded from the training data. At step S205, the processing unit may store the former part with the predetermined symbol into the training data store 160 as the modified training data.

At step S206, the processing unit may determine whether an exit condition is satisfied or not. For example, if a predetermined amount of the training data has been processed, the exit condition is determined to be satisfied. If the processing unit determines that the exit condition is not satisfied yet at step S206, the process may loop back to step S201 for further training data modification. On the other hand, if the processing unit determines that the exit condition has been already satisfied at the step S206, the process may proceed to step S207.

At step S207, the processing unit may perform iterations of training the RNN language model 130 using the modified and original training data that are stored in the training data store 160. Note that the iteration of the training may be performed for each training sentence or a set of training sentence. For example, a predetermined number of epochs may be performed repeatedly. And the process may end at the step S208.

Hereinafter, referring to FIG. 4 together with FIG. 8, the rescoring process with resetting operation according to the other exemplary embodiment of the present invention is further described. Note that the rescoring process described with FIGS. 4 and 8 may be executed by a processing unit that implements the rescoring module 120 and the RNN language model 130 shown in FIG. 1. Also note that the direction of rescoring of the RNN language model 130 according to the other exemplary embodiment is a backward direction.

At first the rescoring module 120 may prepare the backward RNN language model 130 on a memory, for example. Then the lattice 104 is read by the rescoring module 120. The rescoring module 120 feeds each word in the input sentence 104c into the backward RNN language model 130 successively according to the direction that is backward direction in the described embodiment. Thus, a word sequence {<BOS>, V, W, X, Y, Z, <EOS>} is fed into the RNN language model 130 in a reverse order, i.e., {<EOS>, Z, Y, X, W, V, <BOS>}.

When there is no uncertain word in hypothesis, for each time a word is fed into the backward RNN language model 130 the history of the preceding (next) words is accumulated in the hidden state 130a of the RNN language model 130. The hidden state may affect the calculated probability of the succeeding (previous) words.

In rescoring the input sentence, the rescoring module 120 may reset the hidden state 130a of the RNN language model 130 to a state that have accepted the predetermined symbol (the end of the sentence in the described embodiment) in response to a predetermined condition being satisfied. When a word with a confidence score lower than the threshold is found, the rescoring module 120 resets the hidden state 130a of the RNN language model 130.

Figure 8:
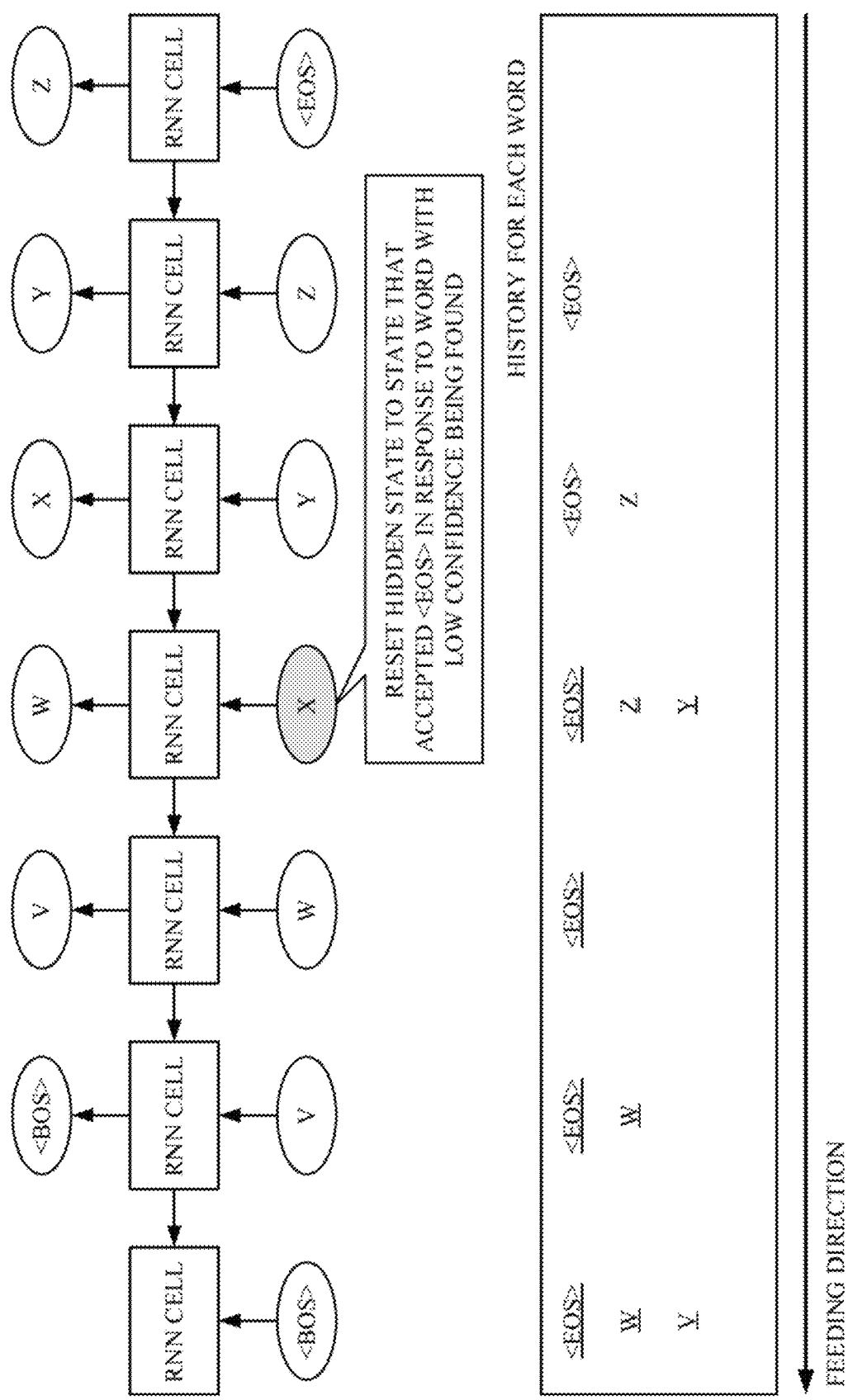
FIG. 8 describes a schematic of resetting operation in the rescoring process using the backward RNN language model according to other exemplary embodiment of the present invention.

FIG. 8 describes a schematic of resetting operation in the rescoring process using the backward RNN language model. When there is an uncertain word (X) in the hypothesis, the history of the preceding (next) words accumulated in the hidden state of the RNN language model 130 is discarded at timing after the uncertain word (X) is fed. The rescoring is restarted after the word satisfying the predetermined condition (X), as if the former part of the input sentence is ended at the position of the uncertain word (X). A latter part of the input sentence before the position of the uncertain word (X) may be preserved.

According to the aforementioned embodiments of the present invention, a technique capable of training a model used for hypothesis rescoring with mitigating negative effect due to an error in the hypothesis is provided. Also according to the aforementioned embodiments of the present invention, technique capable of rescoring a hypothesis with improved performance is provided.

Languages to which the novel training data modification and/or the novel rescoring process may be applicable include, but by no means limited to, Arabic, Chinese, English, French, German, Japanese, Korean, Portuguese, Russian, and Spanish, for instance.

Furthermore, in the aforementioned embodiments, the RNN language model 130 is used for hypothesis rescoring as a model capable of retaining a history of one or more preceding elements or words. The RNN is preferable since the hidden state of the RNN language model can represent an infinite history of preceding elements or words. However, other model such as an n-gram language model that is also capable of retaining a history of a predetermined number of preceding elements may also be contemplated.

Furthermore, in the aforementioned embodiments, the novel training data modification and the novel rescoring process are applied to the speech recognition. However, such negative effect on hypothesis rescoring due to an error in a hypothesis may also arise in various recognition tasks other than the speech recognition. In one or more embodiments, the recognition process to which the novel training data modification and/or the novel rescoring process may include machine translation, part-of-speech tagging, parsing, optical character recognition, handwriting recognition, image captioning or video captioning.

Experimental Studies

A program implementing the system shown in FIG. 1, the training process shown in FIG. 3 and the rescoring process shown in FIG. 4 according to the exemplary embodiment were coded and executed.

A LSTM acoustic model and a large n-gram language model were used as the acoustic model 112 and the weak language model 114 for primary decoding, respectively. The ASR system including the LSTM acoustic model and the large n-gram language model were used without lattice rescoring as Comparative Example 1.

A LSTM language model was employed as the RNN language model 130 for hypothesis rescoring. A telephone speech corpus for research and development, SWITCHBOARD, including 262 hours of Switchboard 1 audio with transcripts provided by Mississippi State University and 1698 hours from the Fisher data collection, and 15 hours of CallHome audio, was used. Transcriptions of almost 2000 hours of the audio data were used for training the LSMT language model. For Example 1 and Example 3, the LSTM language model was trained with the training data modification functionality. Only 30% of training sentences was subject to the training data modification. On the other hand, for Example 2 and Comparative Example 2, the LSTM language model was trained without the training data modification.

For Example 1 and Comparative Example 2, standard rescoring without resetting was performed in the speech recognition. On the other hand, for Example 2 and Example 3, the novel rescoring with resetting was performed in the speech recognition. The average acoustic score calculated for duration corresponding to each word was used as a confidence score and three standard deviations on lower side of mean (average $-3\sigma(\text{sigma})$) was used as a threshold for the confidence score. The average and standard deviation was estimated by the 100 best hypotheses for each lattice 104.

Then, ASR accuracy of the constructed speech recognition systems of the Examples 1-3 and the Comparative Example 1 & 2 were evaluated using validation data in the SWITCHBOARD dataset. The WER (Word Error Rate) was utilized as ASR accuracy metric. The WER of the reference ASR system was 7.2%, which means the reference ASR system has strong modelling capability even before the lattice rescoring (Comparative Example 1).

The evaluated results of Examples 1-3 and Comparative Examples 1 & 2 are summarized as follow:

| Conditions | training data modification | lattice rescoring with resetting | standard lattice rescoring | WER[%] |
| --- | --- | --- | --- | --- |
| Comparative Example 1 | — | — | — | 7.2 |
| Comparative Example 2 | — | — | * | 6.9 |
| Example 1 | * | — | — | 6.7 |
| Example 2 | — | * | — | 6.9 |
| Example 3 | * | * | — | 6.6 |

The symbol "*" represents that functionality designated by the column is applied.

By comparison with the result of Comparative Examples 2, Examples 1 & 3 showed performance improvement. Even Examples 2 showed performance comparable to the standard rescoring (Comparative Examples 2), which implies that the resetting operation hardly hurts performance. Among Examples 1-3, Example 3, in which the novel training modification in the training phase and the novel lattice rescoring in the inference phase were combined, showed best performance. Examples 1 & 3 outperformed the strong baseline of LSTM standard rescoring (Comparative Example 2).

Computer Hardware Component

Figure 9:
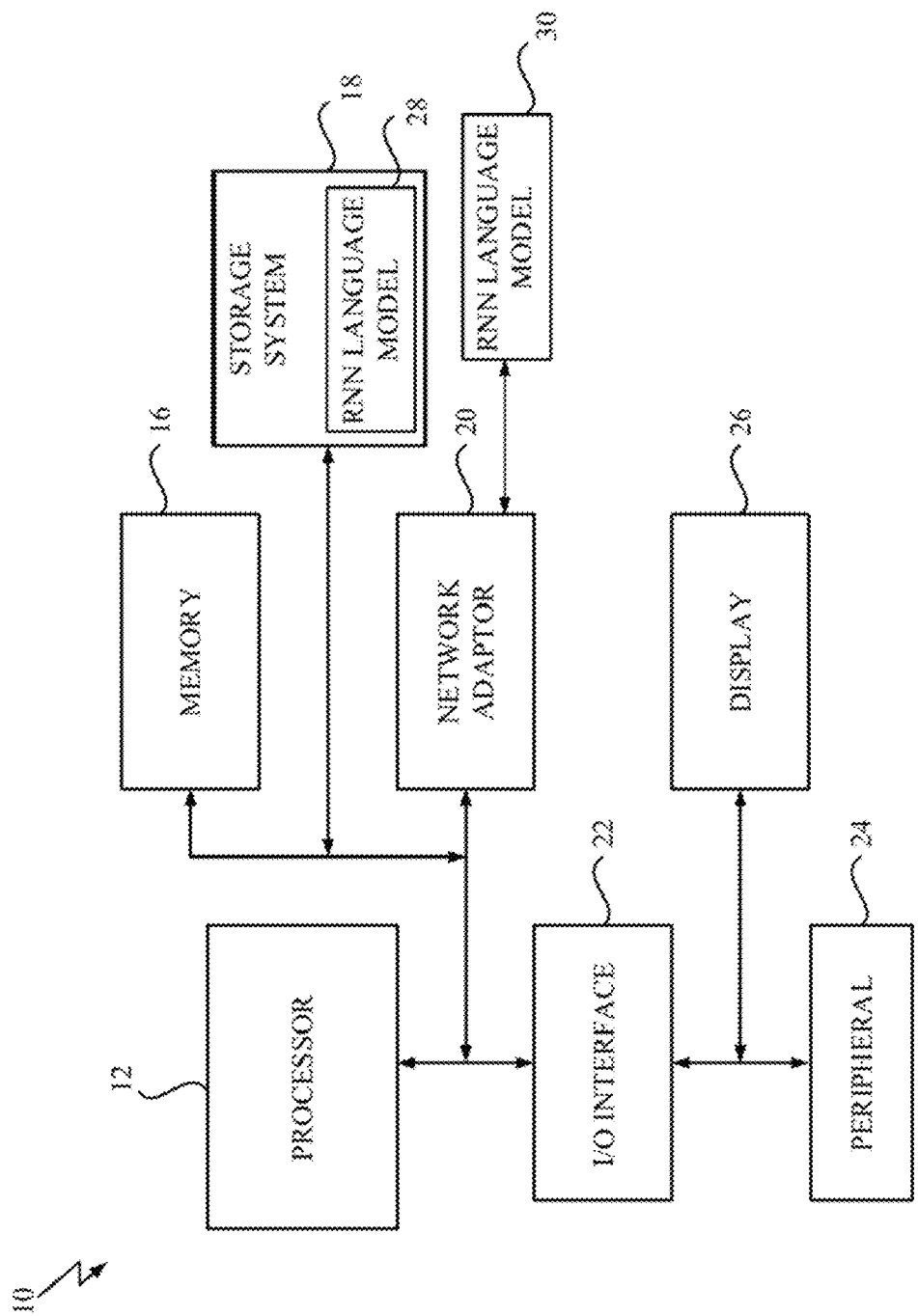
FIG. 9 depicts a computer system according to one or more embodiments of the present invention.

Referring now to FIG. 9, a schematic of an example of a computer system 10, which can be used for implementing the speech recognition system 100, is shown. The computer system 10 shown in FIG. 9 is implemented as a computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention. In some embodiments, the RNN language model 28 can be stored on the storage system 18. The computer 10 can train the RNN language model 28 stored on the storage system 18.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc. In some embodiments, the computer 10 can communicate with RNN language model 30 using the network adaptor 20. The computer 10 can train the RNN language model 30 using the network adaptor 20. The RNN language model 30 can be embodiment as one or more nodes.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for training a model, the method comprising:
   obtaining a training sequence of elements for the model, the model being capable of retaining a history of one or more preceding elements and having a selectable temporal direction of prediction;
   splitting the training sequence into a plurality of parts, wherein the selectable temporal direction of prediction is selectively chosen from a former part or a latter part of the plurality of parts depending upon if a backward direction or a forward direction of prediction is selected;
   selecting one part of the plurality of the parts depending on the selectable temporal direction of the prediction to generate a modified training data; and
   training the model using the modified training data.

2. The method of claim 1, wherein the model is used for rescoring one or more input sequences obtained as hypotheses of a recognition process.

3. The method of claim 2, wherein the model includes a recurrent type neural network language model, the training sequence of the elements includes a training sentence including a plurality of words, the recognition process includes speech recognition and a result outputted from the speech recognition is rescored with the model as the hypothesis.

4. The method of claim 2, wherein the recognition process is selected from the group consisting of speech recognition, machine translation, part-of-speech tagging, parsing, optical character recognition, handwriting recognition, image captioning, and video captioning.

5. The method of claim 2, wherein, in rescoring each input sequence with the model, the history is discarded at least in part in response to a condition related to a confidence of the recognition process about one input element in the input sequence being satisfied.

6. The method of claim 5, wherein the model has a hidden state representing the history, the history is discarded by resetting the hidden state of the model to a state having accepted a predetermined symbol and the rescoring is restarted in response to one satisfying the condition.

7. The method of claim 1, wherein the method further comprises:
adding a predetermined symbol at a boundary of the one part, the modified training data including the one part and the predetermined symbol.

8. The method of claim 7, wherein the predetermined symbol represents a beginning of a sequence or an end of a sequence depending on the direction of the prediction.

9. The method of claim 7, wherein the predetermined symbol represents occurrence of an error of recognition and the model has an additional token corresponding to the predetermined symbol.

10. The method of claim 7, wherein the direction of the prediction is the forward direction, the latter part of the plurality of the parts is selected as the one part and the boundary is a beginning of the latter part.

11. The method of claim 7, wherein the direction of the prediction is the backward direction, the former part of the plurality of the parts is selected as the one part and the boundary is an end of the former part.

12. The method of claim 1, wherein the training sequence is divided at a position determined randomly or statistically.

13. A computer-implemented method for rescoring an input sequence obtained as a hypothesis of a recognition process, the method comprising:
preparing a model for rescoring the hypothesis, the model being capable of retaining a history of one or more preceding elements and having a selectable temporal direction of rescoring, wherein the selectable temporal direction of rescoring is selectively chosen from a former element of among the preceding elements or from a next element depending upon if a backward direction or a forward direction of rescoring is selected;
feeding the input sequence into the model according to the selectable temporal direction of rescoring;
in response to a condition related to confidence of the recognition process about one input element in the input sequence being satisfied, discarding the history at least in part: and
outputting a result of rescoring the input sequence.

14. The method of claim 13, wherein the model has a hidden state representing the history, the history is discarded by resetting the hidden state of the model to a state having accepted a predetermined symbol and the rescoring is restarted in response to one satisfying the condition.

15. The method of claim 13, wherein the model is built by:
obtaining a training sequence of elements;
splitting the training sequence into a plurality of parts;
selecting one part of the plurality of the parts depending on the direction of the rescoring to generate a modified training data; and
training the model using the modified training data.

16. The method of claim 13, wherein the model has an additional token representing an error of the recognition process.

17. A computer system for training a model, by executing program instructions, the computer system comprising:
a memory storing the program instructions;
a processing unit in communications with the memory for executing the program instructions, wherein the processing unit is configured to:
obtain a training sequence of elements for the model, the model being capable of retaining a history of one or more preceding elements and having a selectable temporal direction of prediction;
split the training sequence into a plurality of parts, wherein the selectable temporal direction of prediction is selectively chosen from a former part or a latter part of the plurality of parts depending upon if a backward direction or a forward direction of prediction is selected;
select one part of the plurality of the parts depending on the selectable temporal direction of the prediction to generate a modified training data; and
train the model using the modified training data.

18. The computer system of claim 17, wherein the model is used for rescoring one or more input sequences obtained as hypotheses of a recognition process.

19. The computer system of claim 17, wherein the processing unit is configured to:
add a predetermined symbol at a boundary of the one part, wherein the modified training data includes the one part and the predetermined symbol.

20. A computer system for rescoring an input sequence obtained as a hypothesis of a recognition process, by executing program instructions, the computer system comprising:
a memory storing the program instructions;
a processing unit in communications with the memory for executing the program instructions, wherein the processing unit is configured to:
prepare a model for rescoring the hypothesis, wherein the model is capable of retaining a history of one or more preceding elements and has a selectable temporal direction of rescoring, wherein the selectable temporal direction of rescoring is selectively chosen from a former element of among the preceding elements or from a next element depending upon if a backward direction or a forward direction of rescoring is selected;
feed the input sequence into the model according to the selectable temporal direction of rescoring;
in response to a condition related to confidence of the recognition process about one input element in the input sequence being satisfied, discard the history at least in part; and
output a result of rescoring the input sequence.

21. The computer system of claim 20, wherein the model has a hidden state representing the history, the history is discarded by resetting the hidden state of the model to a state having accepted a predetermined symbol and the rescoring is restarted in response to one satisfying the condition.

22. A computer program product for training a model, the computer program product comprising a non-transitory computer readable storage medium having program instructions embodied therewith, the program instructions executable by a computer to cause the computer to perform a computer-implemented method comprising:

obtaining a training sequence of elements for the model, the model being capable of retaining a history of one or more preceding elements and having a selectable temporal direction of prediction;

splitting the training sequence into a plurality of parts, wherein the selectable temporal direction of prediction is selectively chosen from a former part or a latter part of the plurality of parts depending upon if a backward direction or a forward direction of prediction is selected;

selecting one part of the plurality of the parts depending on the selectable temporal direction of the prediction to generate a modified training data; and training the model using the modified training data.

23. The computer program product of claim 22, wherein the model is used for rescoring one or more input sequences obtained as hypotheses of a recognition process.

24. The computer program product of claim 22, wherein the method further comprises:

adding a predetermined symbol at a boundary of the one part, the modified training data including the one part and the predetermined symbol.

25. A computer program product for rescoring an input sequence obtained from a recognition process, the computer program product comprising a non-transitory computer readable storage medium having program instructions embodied therewith, the program instructions executable by a computer to cause the computer to perform the method of claim 13.

* * * * *